United States Patent
Jang et al.

(10) Patent No.: US 8,945,734 B2
(45) Date of Patent: Feb. 3, 2015

(54) SECONDARY BATTERY INCLUDING PROTECTION CIRCUIT MODULE

(75) Inventors: Youngcheol Jang, Yongin-si (KR); Eunok Kwak, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1043 days.

(21) Appl. No.: 12/591,831

(22) Filed: Dec. 2, 2009

(65) Prior Publication Data

US 2010/0136373 A1 Jun. 3, 2010

(30) Foreign Application Priority Data

Dec. 2, 2008 (KR) ........................ 10-2008-0121518

(51) Int. Cl.
| | | |
|---|---|---|
| H01M 14/00 | (2006.01) | |
| H01M 2/04 | (2006.01) | |
| H01M 2/10 | (2006.01) | |
| H01M 10/42 | (2006.01) | |
| H01M 2/02 | (2006.01) | |

(52) U.S. Cl.
CPC ........ *H01M 2/0404* (2013.01); *H01M 2200/00* (2013.01); *H01M 2220/30* (2013.01); *H01M 2/0217* (2013.01); *H01M 2/1066* (2013.01); *H01M 10/425* (2013.01)
USPC ............................................................ 429/7

(58) Field of Classification Search
CPC . H01M 2/02017; H01M 2/04; H01M 2/0404; H01M 2/1066; H01M 10/42; H01M 10/425; H01M 2200/00; H01M 2220/30
USPC .............................................. 429/7, 162, 175
See application file for complete search history.

(56) References Cited

U.S. PATENT DOCUMENTS

| | | | |
|---|---|---|---|
| 5,525,071 A * | 6/1996 | Obara et al. ................... 439/326 |
| 7,462,417 B2 | 12/2008 | Moon | |
| 2005/0208345 A1 | 9/2005 | Yoon et al. | |
| 2005/0214597 A1* | 9/2005 | Kim et al. .......................... 429/7 |
| 2006/0046139 A1* | 3/2006 | Suzuki et al. .................. 429/175 |
| 2007/0154783 A1 | 7/2007 | Jeon | |
| 2007/0160878 A1 | 7/2007 | Kim et al. | |
| 2007/0202396 A1 | 8/2007 | Jung | |
| 2008/0008935 A1 | 1/2008 | Wu | |
| 2008/0187823 A1* | 8/2008 | Byun et al. ..................... 429/122 |
| 2008/0292955 A1* | 11/2008 | Byun et al. ..................... 429/163 |
| 2009/0186268 A1 | 7/2009 | Song | |
| 2010/0143793 A1* | 6/2010 | Yamamoto ..................... 429/175 |

FOREIGN PATENT DOCUMENTS

| | | | | |
|---|---|---|---|---|
| JP | 2007035502 A * | 2/2007 | ............. | H01M 2/10 |
| KR | 1020070039596 A | 4/2007 | | |
| KR | 1020090078181 A | 7/2009 | | |
| WO | WO 2006126379 A1 * | 11/2006 | ............. | H01M 2/04 |

* cited by examiner

*Primary Examiner* — Edu E Enin-Okut
(74) *Attorney, Agent, or Firm* — Robert E. Bushnell, Esq.

(57) ABSTRACT

An easily assembled pack type secondary battery. The secondary battery includes a bare cell, a protection circuit module having a circuit board and coupled with the bare cell, and a top case covering the circuit board of the protection circuit module and having a coupling slot into which at least part of the circuit board is fitted. The secondary battery allows the top case to be attached to the protective circuit module and the bare cell without having to use an adhesive and without requiring an injection molding technique.

6 Claims, 4 Drawing Sheets

US 8,945,734 B2

SECONDARY BATTERY INCLUDING PROTECTION CIRCUIT MODULE

CLAIM OF PRIORITY

This application is based on and claims priority to Korean Patent Application No. 10-2008-0121518 filed on Dec. 2, 2008 in the Korean Intellectual Property Office (KIPO), the entire contents of which are hereby incorporated by reference.

BACKGROUND OF THE INVENTION

1. Field of the Invention

The present invention relates to a secondary battery, and more particularly to, a coupling structure for a secondary battery.

2. Description of the Related Art

In recent years, due to the rapid development of electronics, portable electronic devices are being widely distributed. Rechargeable secondary batteries are being mainly used as power sources for portable electronic devices.

Today, a pack type battery is widely used as a secondary battery. The pack type battery is configured as a single unit into which a bare cell and a protection circuit module (PCM) are integrated. The pack type secondary battery includes a bare cell, a PCM, and a top case. The PCM is coupled to a top side of the bare cell and the top case is coupled to cover the PCM. In an existing pack type secondary battery, the top case is coupled to the bare cell or the PCM by either resin molding or an adhesive. However, the coupling structure requires an injection molding process or the formation of adhesive, so that manufacturing thereof becomes complicated. What is needed is an improved design for a pack-type secondary battery where it is not necessary to use an adhesive and it is not necessary to employ an injection molding process to attach the top case to the bare cell and the PCM.

SUMMARY OF THE INVENTION

The present invention has been made in view of the above problems, and the present invention provides a pack type secondary battery, the manufacturing of which is simple.

Another aspect of the present invention is to provide a pack type secondary battery whose respective components are securely coupled to each other without requiring the use of adhesives and without requiring an injection molding process.

In accordance with an aspect of the present invention, there is provided a secondary battery that includes a bare cell, a protection circuit module having a circuit board, the protection circuit module being coupled to the bare cell and a top case covering the circuit board of the protection circuit module, the top case having a coupling slot arrangement into which at least part of the circuit board is arranged.

The circuit board can include a plate elongated in a first direction, the coupling slot arrangement of the top case can include two coupling slots to accommodate ends of the circuit board. The top case can also include a cover plate and a side wall extending from the cover plate, the circuit board of the protection circuit module can include a first surface facing the bare cell and a second surface facing the cover plate of the top case and each of said coupling slots of the top case can be arranged in an inner side of the side wall.

The inner side of the side wall of the top case can include inner walls extending from ones of the coupling slots to the bare cell, each of said inner walls of the top case can include an outwardly extending sloped portion arranged at ends of the top case. An outermost extent of ones of said ends of the circuit board can extend further outwards than an innermost extent of a corresponding sloped portion of a corresponding one of said inner walls the top case.

Each of said ends of the circuit board can be connected to the second surface of the circuit board by a sloped portion. The inner side of the side wall of the top case can include inner walls, each of said inner walls can extend from a corresponding one of the coupling slots to the bare cell, wherein an outermost portion of each end of the circuit board can extend further outwards than an innermost extent of a sloped portion of a corresponding one of the inner walls of the top case.

The protection circuit module can also include two supporting members to couple the circuit board to the bare cell. Each of the supporting members can include a support extending between the circuit board of the protection circuit module and the bare cell, a first connector extending from the top of the support and being coupled to the circuit board of the protection circuit module and a second connector extending from the bottom of the support and being coupled to the bare cell, the support of each of the supporting members can be spaced-apart from ends of the circuit board. Each of the ends of the circuit board can extend further outward than corresponding supports of ones of the supporting members, the top case can also include accommodating slots, each of said accommodating slots to accommodate a corresponding second connector of a corresponding one of the supporting members.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
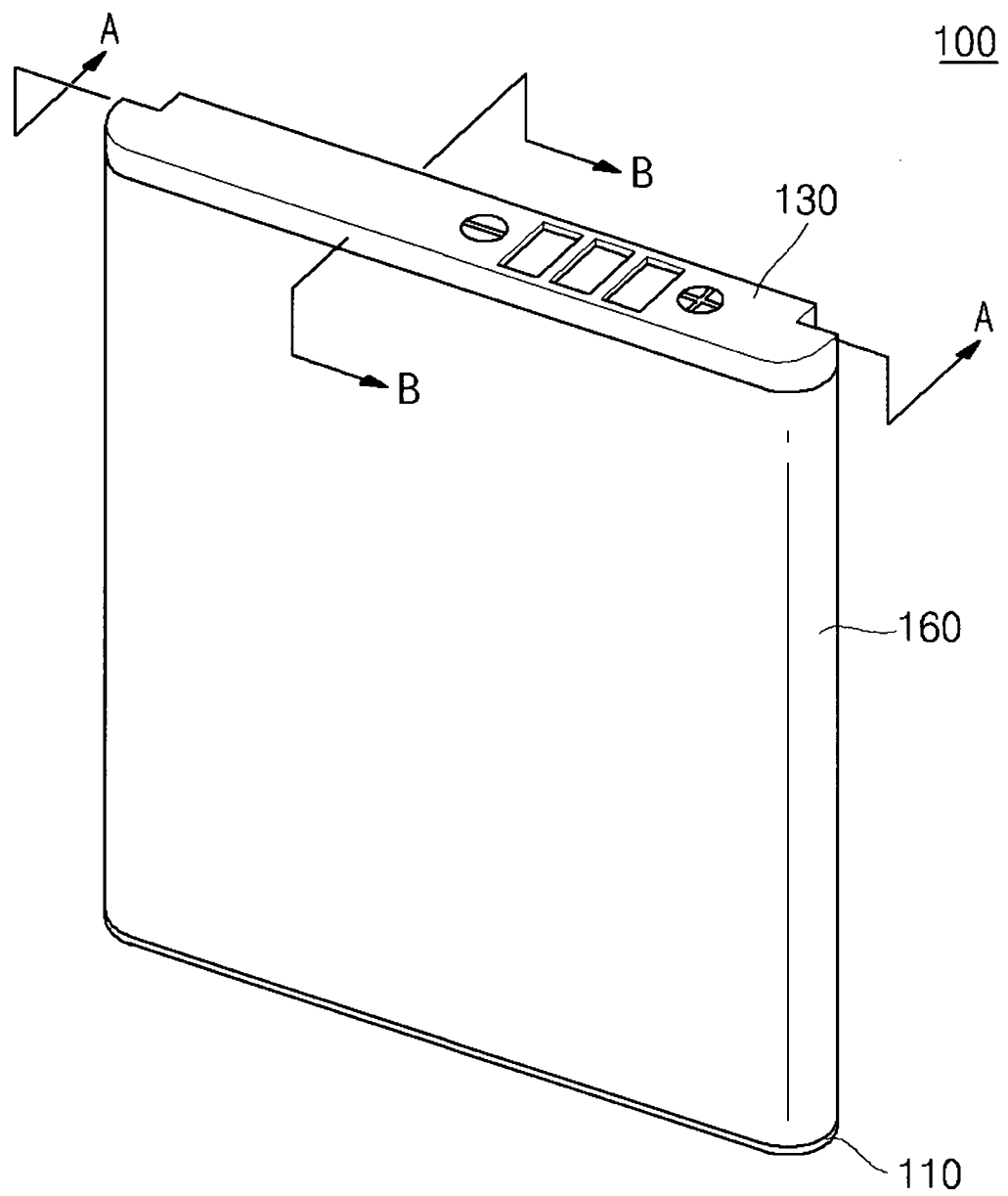
FIG. 1 is a perspective view of a secondary battery according to a first embodiment of the present invention.
Figure 2:
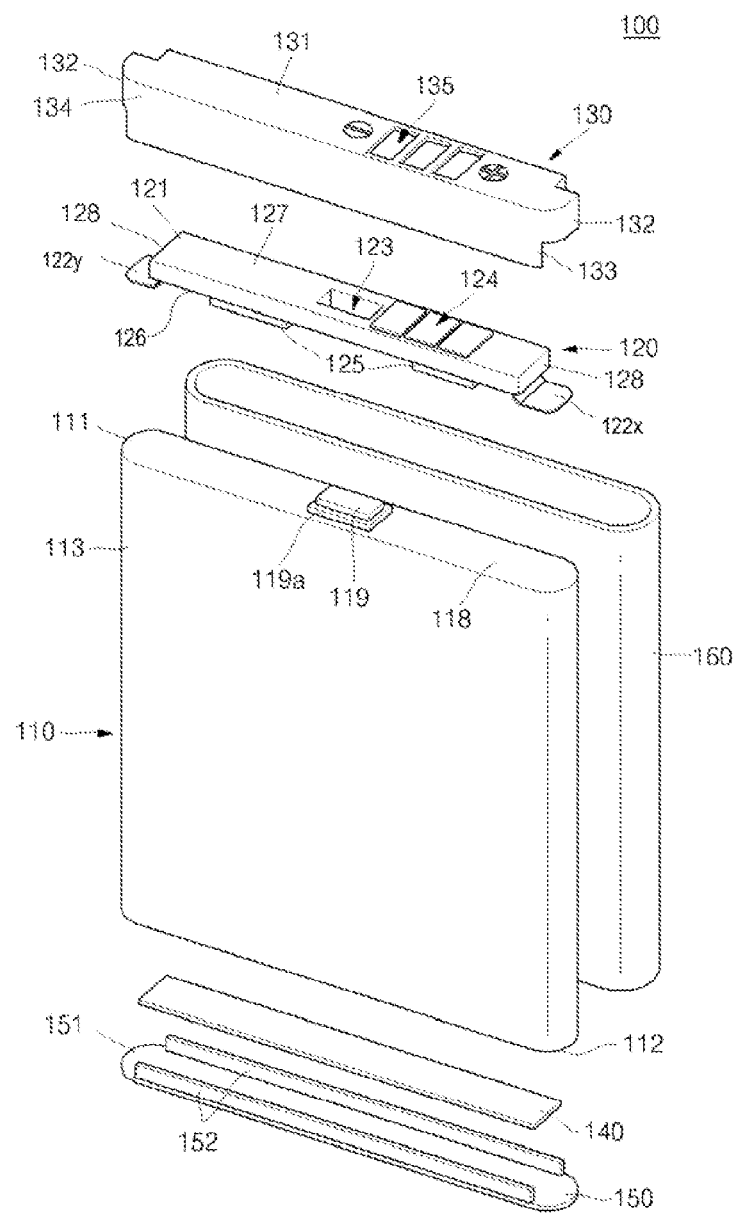
FIG. 2 is an exploded perspective view of the secondary battery of FIG. 1.
Figure 3:
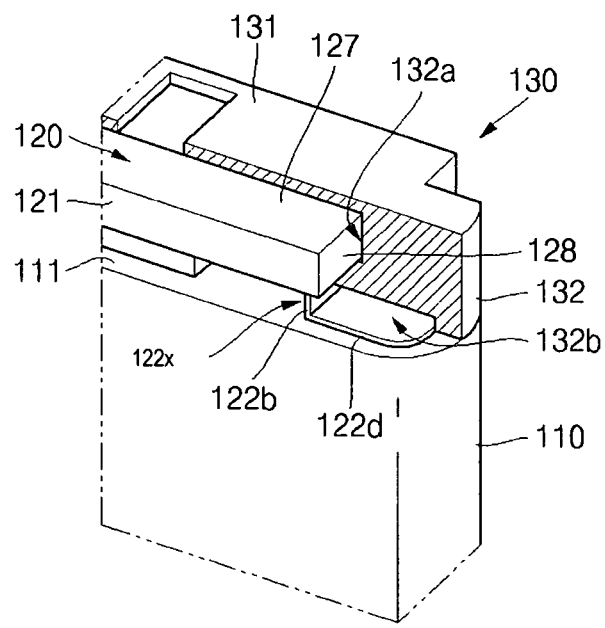
FIG. 3 is a partial perspective view of the interior of a top case of the secondary battery of FIG. 1 by partially cutting the top case.
Figure 4:
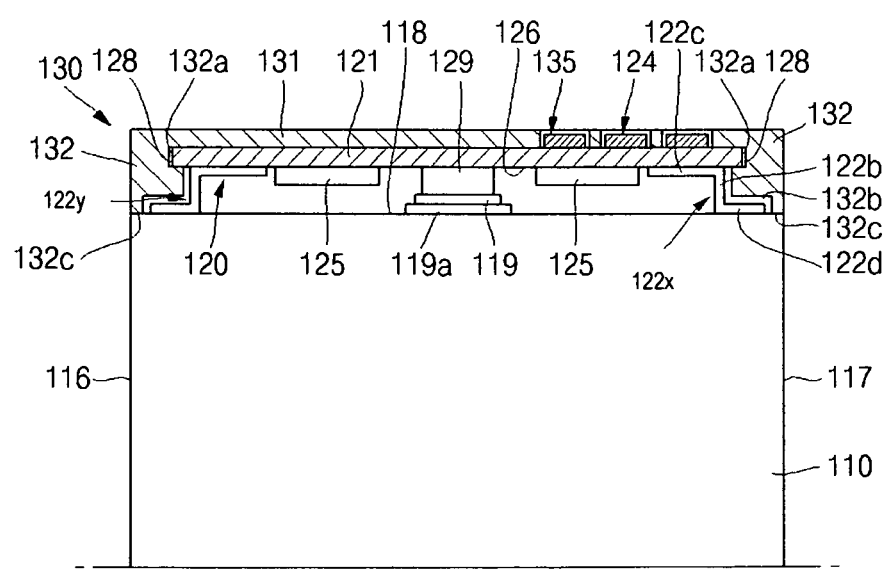
FIG. 4 is a sectional view illustrating the top case of the secondary battery of FIG. 1, taken along the line A-A.
Figure 5:
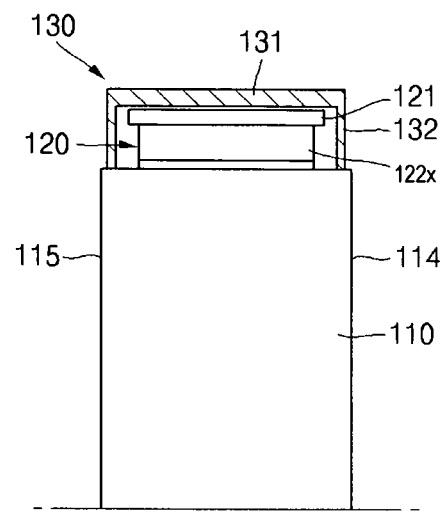
FIG. 5 is a sectional view of the top case of the secondary battery of FIG. 1, taken along the line B-B.

Hereinafter, embodiments of the present invention will be described in detail with reference to the accompanying drawings.

Referring to FIGS. 1 through 5, the secondary battery 100 includes a bare cell 110, a protection circuit module (PCM) 120, a top case 130, an adhesive member 140, a bottom case 150, and a label 160. The bare cell 110 provides electric energy and includes an electrode assembly, a can accommodating the electrode assembly, and a cap assembly covering the can. The electrode assembly includes a positive electrode plate, a negative electrode plate, and a separator which are wound together. Electrode taps are coupled to the positive and negative electrode plates, respectively. The bare cell 110 is a thin plate having a top side 111, a bottom side 112, and a lateral side 113. The top and bottom sides 111 and 112 are elongate and face each other. The top side 111 has a first terminal 119 protruding therefrom. In this embodiment, the first terminal 119 is a negative terminal. A positive terminal, that is, a second terminal 118 becomes the overall outer surface of the bare cell 110 with the exception of the first terminal 119. The first terminal 119 and the second terminal 118 are insulated from each other by an insulating gasket 119a wrapped about the first terminal 119. On the bottom side 112, a supporting plate 151, which will be described later, is attached to the bare cell 110 by an adhesive member 140 such as a double-sided tape. The lateral side 113 connects the top side 111 to the bottom side 112 and includes a first wide side 114, a second wide side 115, a first narrow side 116, and a second narrow side 117. The first and second wide sides 114 and 115 face each other and extend in the width direction of the bare cell 110. The first and second narrow sides 116 and 117 connect the first and second wide sides 114 and 115 to each other.

The PCM 120 includes a circuit board 121, a first electrode lead plate 129, a first supporting member 122x, and a second supporting member 122y. The PCM 120 controls overall operations including charging and discharging of the secondary battery 100. The circuit board 121 is an approximately-rectangular-plate type printed circuit board on which wiring patterns are printed and which is elongated in the length direction of the top side 111 of the bare cell 110. The circuit board 121 has a width corresponding to that of the top side 111 of the bare cell 110. The circuit board 121 includes a first surface 126 and a second surface 127 facing each other. Electric circuit devices 125 are mounted on the first surface 126 of the circuit board 121. The electric circuit devices 125 include several devices such as a control IC, a charging and discharging switch, a temperature fuse, etc. The first and second supporting members 122x and 122y are respectively coupled in the vicinity of ends of the first surface 126. The first surface 126 is spaced apart from the top side 111 of the bare cell 110 and faces the same.

On the second surface 127 of the circuit board 121, an external terminal 124 is provided for electrical connection to an external load or a charger. The second surface 127 of the circuit board 121 faces a cover plate 131 of the top case 130. The circuit board 121 is provided with a passage aperture 123 formed in the center thereof. Through the passage aperture 123, the first electrode lead plate 129 is welded to the first terminal 119 of the bare cell 110. Ends 128 of the circuit board 121 are inserted into coupling slots 132a of top case 130, which are described later, so that the PCM 120 can be securely coupled to the top case 130.

The first electrode lead plate 129 is electrically coupled to the first surface 126 of the circuit board 121 and is electrically connected to the first terminal 119 of the bare cell 110 by welding or another method. The welding is carried out through the passage aperture 123 of the circuit board 121. The first electrode lead plate 129 electrically connects the circuit board 121 to the first terminal 119, which is the negative electrode of the bare cell 110.

The first and second supporting members 122x and 122y are positioned near the respective ends 128 of the circuit board 121. The first supporting member 122x is a plate member and includes a support 122b, a first connector 122c and a second connector 122d. The first connector 122c extends from the top of the support 122b while the second connector 122d extends from the bottom of the support 122b. The connectors 122c and 122d make approximate right angles with the support 122b. The first connector 122c extends from the support 122b in the direction opposite to the direction that the second connector 122d extends from support 122b. The first connector 122c is coupled with to first surface 126 of the circuit board 121. The support 122b is positioned closer to an end 128 of the circuit board than the first connector 122c so that the end 128 is slightly spaced apart from the support 122b. In other words, the end 128 protrudes further outwards towards narrow side 117 than the support 122b of the first supporting member 122x. The second connector 122d is spaced apart from the circuit board 121. The second connector 122d is connected to the top side 111 of the bare cell 110 by welding or another method. The second connector 122d is accommodated within an accommodating slot 132b of top case 130, which will be described later. The second supporting member 122y is identical to the first supporting member 122x, thus its description has been omitted.

The circuit board 121 is coupled to and supported by the top side 111 of the bare cell 110 by the first and second supporting members 122x and 122y. Thus, the PCM 120 is coupled to the bare cell 110. At least one of the supporting members 122x and 122y is made of a conductive material to serve as a second electrode lead plate electrically connecting the circuit board 121 to the second terminal 118 as the positive electrode of the bare cell 110. In this embodiment, the supporting member serving as the second electrode lead plate is made of nickel, but is not limited thereto.

The top case 130 includes a cover plate 131 and a side wall 134 extending downward from the cover plate 131. The PCM 120 is accommodated within the top case 130. The cover plate 131 has a shape approximately corresponding to that of the top side 111 of the bare cell 110. The cover plate 131 has a through-hole 135. Through the through-hole 135, the external terminal 124 of the PCM 120 is exposed to an exterior of secondary battery 100. The internal side of the cover plate 131 faces the second surface 127 of the circuit board 121 of the PCM 120.

The side wall 134 includes end portions 132 positioned at ends in the length direction of the top case 130 and a connecting portion 133 connecting the end portions 132 to each other. Ends of each end portions 132 is provided with a contact 132c. Both contacts 132c electrically contact the ends of the top side 111 of the bare cell 110 while supporting the top case 130. The connecting portion 133 downwardly extends further than the end portions 132 and partially covers an upper side of the lateral side 113 of the bare cell 110. The label 160 is attached to a portion of the connecting portion 133 covering the wide sides 114 and 115 of the bare cell 110.

The top case 130 includes the coupling slots 132a formed therein to accommodate the ends 128 of the circuit board 121 of the PCM 120. The coupling slots 132a are formed by carving inner walls of the end portions 132 of the top case 130. Each of the coupling slots 132a is preferably formed to accommodate each of the ends 128 by 0.1 mm to 0.3 mm. The ends 128 of the circuit board 121 are fitted, into the coupling slots 132a of the top case 130 in such a Way that at least one of the circuit board 121 and the top case 130 is elastically deformed. In order to achieve this at least one of the circuit board 121 and the top case 130 is made out of an elastically deformable material, and in this embodiment, both the circuit board 121 and the top case 130 are made out of plastic resin. The circuit board 121 is fitted into the top case 130 so that the top case 130 is coupled therewith more conveniently without having to use adhesives and without having to perform an injection mold process.

Inside the top case 130, accommodating slots 132b are also formed to accommodate the second connectors 122d of the first and second supporting members 122x and 122y. The accommodating slots 132b are formed by carving inner walls of the end portions 132.

The bottom case 150 includes a bottom plate 151 and two extensions 152 upwardly extending from the bottom plate 151. The bottom plate 151 has approximately the same shape as that of the lower side 112 of the bare cell 110 and is attached to the lower side 112 of the bare cell 110 by adhesive member 140. The extensions 152 cover the lower portions of the wide sides 114 and 115 of the bare cell 110. The label 160 is attached to the extensions 152.

The label 160 is attached to wrap around the lateral side 113 of the bare cell 110. The label 160 covers a part of the connecting portion 133 of the top case 130 and the extensions 152 of the bottom case 150 to further secure the bottom case 150 and the top case 130 to the bare cell 110.

The assembly process of the secondary battery 100 according to the embodiment of the present invention will be described sequentially with reference to FIGS. 1 through 5. First, the PCM 120 is coupled to the bare cell 110. This coupling is carried out by welding the second connectors 122d of the first and second supporting members 122x and 122y of the PCM 120 to the top side 111 of the bare cell 110 using a laser. Then, the first electrode lead plate 129 of the PCM 120 is welded to the top side 111 of the bare cell 110 by shining a laser through passage aperture 123 of the circuit board 121. Next, the bottom case 150 is attached to the bottom side 112 of the bare cell 110 using by adhesive member 140.

Then, the PCM 120 is attached (i.e. fitted) to the top case 130. The fitting is carried out by pushing the PCM 120 into the top case 130 so that the PCM 120 is inserted into to case 130 or vise versa. By doing so, at least one of the top case 130 and the circuit board 121 of the PCM 120 is elastically deformed and the ends 128 of the circuit board 121 are inserted into the coupling slots 132a of the top case 130. Thus, the PCM 120 is securely coupled to the top case 130.

Finally, the label 160 is attached to wrap around the lateral side 113 of the bare cell 110. In this case the label 160 covers a part of the connecting portion 133 of the side wall 134 of the top case 130 and the extensions 152 of the bottom case 150 so that the secondary battery 100 is more securely assembled.

Figure 6:
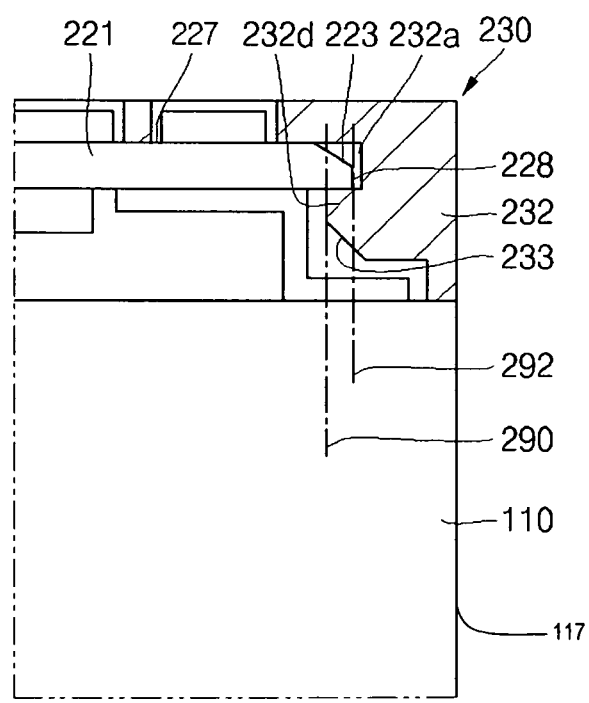
FIG. 6 is a sectional view of the inside of a top case of a secondary battery according to a second embodiment of the present invention.

Turning now to FIG. 6, FIG. 6 illustrates a secondary battery 200 according to the second embodiment of the present invention. Referring to FIG. 6, a second surface 227 and an end portion 228 of a circuit board 221 are connected to each other by sloped portions 223. An outwardly inclined sloped portion 233 is also formed at a lower portion of an inner wall 232d that extends downward from coupling slot 232a in the top case 230. Preferably, the sloped portion 223 of the circuit board 221 is located at an extension line 290 marking the innermost extension of inner wall 232d of end portion 232 of top case 230. Also preferably, sloped portion 233 of the top case 230 is located at an extension line 292 marking an outermost extension of end portion 228 of the circuit board 221. In other words, the outermost portion of end portion 228 of circuit board 221 (marked by extension line 292) extends further outwards towards second narrow side 117 than an innermost extent of sloped portion 233 (marked by extension line 290) formed in inner wall 232d of top case 230. Also, an innermost extent of sloped portion 233 (marked by extension line 290) formed in inner wall 232d of top case 230 extends further outwards towards second narrow side 117 than an upper end of sloped portion 223 of circuit board 221. Due to the sloped portions 223 and 233, the circuit board 221 and the top case 230 can be easily elastically deformed during attachment process of the circuit board 221 to the top case 230 so that the circuit board 221 and the top case 230 can be easily coupled to each other. In this second embodiment, the sloped portion 223 of the circuit board 221 and the sloped portion 233 of the top case 230 are both present, but the present invention is limited thereto. Instead, only one of the two sloped portions 223 and 233 can be formed. Other components of the secondary battery 200 and their operations are identical to that of the secondary battery 100 according to the first embodiment of the present invention, and thus their description has been omitted.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by

What is claimed is:

1. A secondary battery, comprising:
   a bare cell;
   a protection circuit module comprising a circuit board and two supporting members to couple the circuit board to the bare cell, the protection circuit module being coupled to the bare cell; and
   a top case covering the circuit board of the protection circuit module, wherein
   the top case comprises a cover plate; a side wall extending downward from the cover plate; end portions positioned at ends in the length direction of the top case; and coupling slots formed by carving inner walls of the end portions;
   the circuit board comprises a first surface, a second surface, and ends; and the ends are accommodated into the coupling slots;
   each of the supporting members comprises:
   a support extending between the circuit board of the protection circuit module and the bare cell;
   a first connector extending from the top of the support and being coupled to the circuit board of the protection circuit module; and
   a second connector extending from the bottom of the support and being coupled to the bare cell, wherein the support of each of the supporting members is spaced-apart from ends of the circuit board; and
   each of the ends of the circuit board extends further outward than corresponding supports of the supporting members, the top case further comprising accommodating slots, each of said accommodating slots to accommodate a corresponding second connector of a corresponding one of the supporting members.

2. The secondary battery of claim 1, wherein the first surface facing the bare cell and the second surface facing the cover plate of the top case; and each of said coupling slots of the top case being arranged in the inner side of the side wall.

3. The secondary battery of claim 2, wherein the inner side of the side wall of the top case comprises inner walls extending from ones of the coupling slots to the bare cell, each of said inner walls of the top case comprises an outwardly extending sloped portion arranged at end portions of the top case.

4. The secondary battery of claim 2, wherein the first surface of the circuit board is connected to the second surface of the circuit board by a sloped portion at the ends of the circuit board.

5. The secondary battery of claim 4, wherein the inner side of the side wall of the top case comprises an inner walls, each of said inner walls extending from a corresponding one of the coupling slots to the bare cell, wherein an outermost portion of each end of the circuit board extends further outwards than an innermost extent of a sloped portion of a corresponding one of the inner walls of the top case.

6. The secondary battery of claim 3, wherein an outermost extent of one of said ends of the circuit board extends further outwards than an innermost extent of a corresponding sloped portion of a corresponding one of said inner walls of the top case.

* * * * *